June 21, 1927.
H. W. FROST
1,633,011
SPRING SUSPENSION FOR RAILWAY CARS
Filed June 14, 1926
2 Sheets-Sheet 1
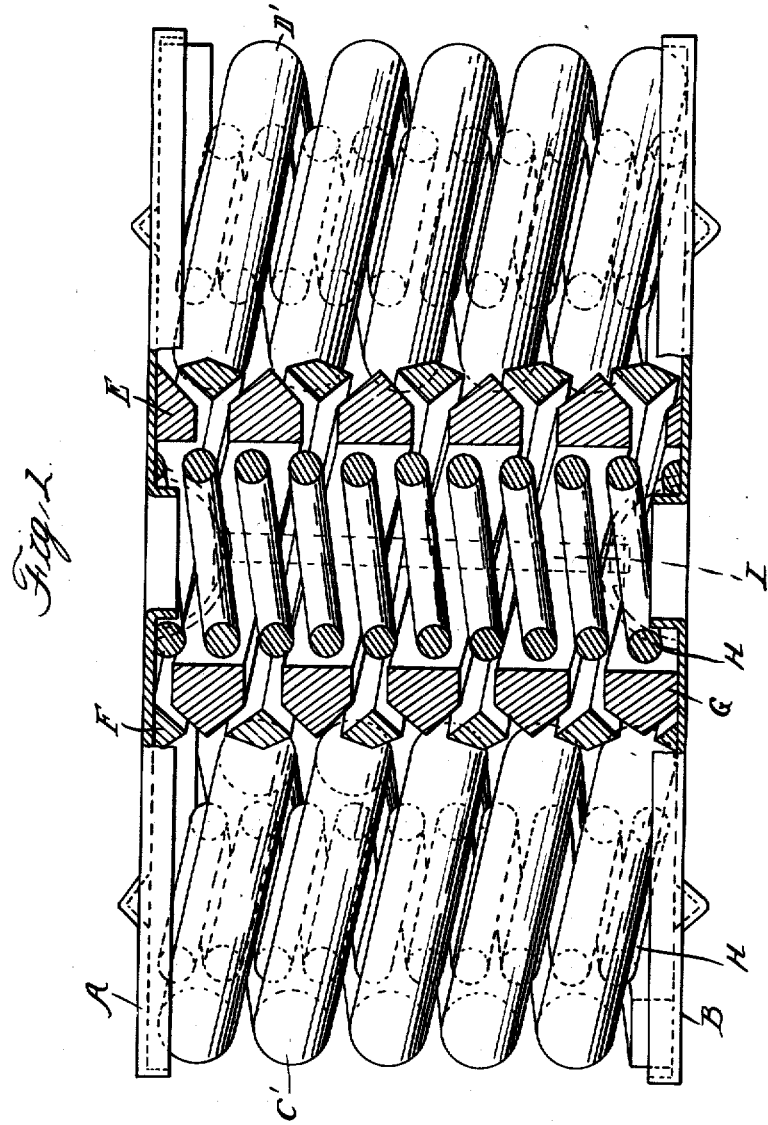

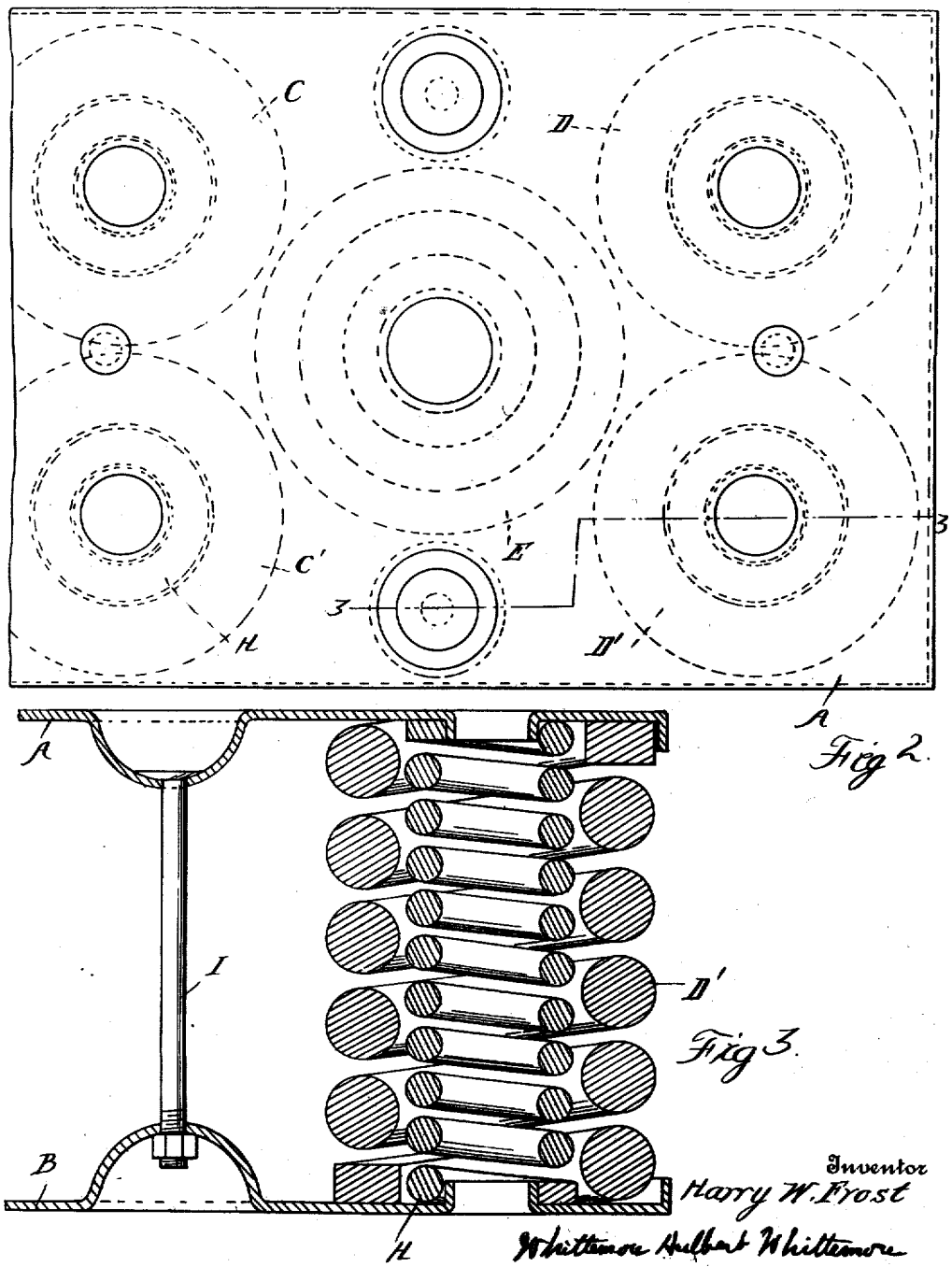

Patented June 21, 1927.

1,633,011

UNITED STATES PATENT OFFICE.

HARRY W. FROST, OF DETROIT, MICHIGAN.

SPRING SUSPENSION FOR RAILWAY CARS.

Application filed June 14, 1926. Serial No. 115,969.

The invention relates to spring suspensions for railway cars and has for its object the obtaining of a construction which will absorb a portion of the energy of shocks and will check oscillations which unrestrained might become dangerous. It is a further object to obtain such results with a simple and inexpensive construction as hereinafter set forth.

In the drawings;

Figure 1 is a vertical central section through my improved spring suspension as designed for application to the bolster of a railway freight car.

Figure 2 is a plan view thereof.

Figure 3 is a cross section on line 3—3 of Figure 2.

In standard railway practice it is usual to support the truck bolsters on a nest of springs secured between top and bottom follower plates. As a specific example there is a construction having three pairs of helical springs uniformly distributed over the area of the plates. If each of these springs is designed to sustain a static load of nineteen thousand pounds, this would make the total capacity of the nest one hundred and fourteen thousand pounds. However under shocks a very much higher inertial pressure will be developed than that of the static load. It has also been found that where the cars are travelling over uneven tracks there is a great tendency to develop cumulative oscillations which frequently become dangerous and may result in the derailing of the truck.

As has been stated, it is an object of the present invention to absorb a portion of the energy of shocks so as to avoid violent recoil and to thereby check cumulative oscillations. At the same time it is desired to maintain a sufficiently lively action in the springs to take care of ordinary oscillations. This I accomplish by associating with the live springs a frictionally resisting shock absorbing spring and by so proportioning the parts as to permit the desirable freedom for oscillation but to prevent oscillations of abnormal amplitude.

The frictional resistance spring is preferably of the type illustrated in patent to George L. Harvey No. 758,066 issued April 26, 1904. This consists of a pair of interlaced helical springs having non-parallel convolutions which are progressively brought into frictional contact as the spring is deflected. The effect is to introduce a large factor of resistance to a sudden shock or compression, the greater part of the energy being absorbed and dissipated and only a small fraction being available for returning the spring to normal condition. A spring of this character is not designed for the suspension of a static load and if used as a substitute for live springs, would not properly function. This is for the reason that with the spring properly proportioned for sustaining the static load, there would be too great resistance to deflection or where properly proportioned for inertial loads there would not be sufficient power of recoil to restore the spring to normal position.

To avoid the objections above described I combine with such a shock absorbing spring properly designed for absorbing the energy of inertial loads a sufficient number of live springs to take care of the static load and to maintain the desired freedom of action. This may be accomplished by the omission of a central pair of helical springs of standard construction and substituting therefor a single centrally arranged shock absorbing spring. As shown in detail A and B are respectively the top and bottom follower plates; C, C', D, D' pairs of live helical springs and E the centrally arranged shock absorbing spring. The latter consists of an outer helical member F and the inner helical member G having wedge-shaped engaging faces non-parallel helically to produce a progressively increasing area for frictional contact during compression. Each of the five springs has preferably arranged within the same a smaller helical spring H and bolts or other connecting links I which extend between the plates A and B to limit the separation thereof.

In the specific construction of composite spring designed to replace the specific construction above described the two helical springs which have been removed will decrease the sustaining power of the nest by twice nineteen thousand or thirty-eight thousand pounds reducing the total from one hundred and fourteen thousand to seventy six thousand pounds. The shock absorbing spring is designed to offer a resistance to compression of one hundred and fifty thousand pounds but has power for recoil of only eighteen thousand pounds. The latter added to the power of the four live helical springs would bring the total sustaining power of the nest to ninety-four thousand pounds in place of the one hundred and fourteen thousand pounds of the old construction. However, for resisting inertial force, if the one hundred and fifty thousand pounds of the shock absorbing spring is added to the seventy six thousand pounds it will make a total of two hundred and twenty six thousand pounds which is greatly in excess of the resistance in the old construction. It will be understood that these figures are only exemplary and that my improved construction can be variously proportioned to suit the needs.

With the construction described in operation, the free helical springs in conjunction with the return power of the shock absorbing spring will take care of all the ordinary oscillations produced by slight irregularities in the track. On the other hand greater irregularities such as produced by bad rail joints or switch points will not cause excessive oscillations as a large part of the energy of such shocks is frictionally absorbed and does not enter into the recoil.

As appears from the above description the term "static load" as herein used, means the sprung weight of the car plus the weight of its contents when fully loaded. On the other hand by "inertial load" is meant the additional force which is exerted by this mass when in momentum.

What I claim as my invention is:

1. A spring suspension for railway cars, comprising a nest of freely movable or live springs and one or more frictional resistance springs acting in unison.

2. A spring suspension for railway cars, comprising top and bottom follower plates, a plurality of freely movable helical springs interposed between said plates and distributed about the area thereof and one or more frictional resistance springs, all of said springs acting in unison.

3. A spring suspension for railway cars, comprising a freely movable helical spring and a shock absorbing spring having frictionally interengaging helices acting in unison with said freely movable spring.

4. A spring suspension for railway cars, comprising top and bottom follower plates, a plurality of freely movable helical springs between said plates at opposite ends and sides thereof and a centrally arranged shock absorbing spring having frictionally interengaging helices, all of said springs acting in unison.

5. A spring suspension for railway cars having a predetermined maximum static load comprising a freely movable spring capable of sustaining said static load and a frictional resistance spring for absorbing inertial loads, the said springs acting in unison.

6. A spring suspension for railway cars having a predetermined maximum static load comprising a freely movable spring and a frictional resistance spring acting in unison, said springs being in proportion to each other to freely sustain said static load and to absorb a portion of the energy of inertial loads.

7. A spring suspension for railway cars having a predetermined maximum static load comprising a freely movable spring and a frictional resistance spring acting in unison, said springs being proportioned to sustain said static load and freely return the same to normal position and to absorb the greater portion of the energy of inertial loads.

In testimony whereof I affix my signature.

HARRY W. FROST.

power of the nest to ninety-four thousand pounds in place of the one hundred and fourteen thousand pounds of the old construction. However, for resisting inertial force, if the one hundred and fifty thousand pounds of the shock absorbing spring is added to the seventy six thousand pounds it will make a total of two hundred and twenty six thousand pounds which is greatly in excess of the resistance in the old construction. It will be understood that these figures are only exemplary and that my improved construction can be variously proportioned to suit the needs.

With the construction described in operation, the free helical springs in conjunction with the return power of the shock absorbing spring will take care of all the ordinary oscillations produced by slight irregularities in the track. On the other hand greater irregularities such as produced by bad rail joints or switch points will not cause excessive oscillations as a large part of the energy of such shocks is frictionally absorbed and does not enter into the recoil.

As appears from the above description the term "static load" as herein used, means the sprung weight of the car plus the weight of its contents when fully loaded. On the other hand by "inertial load" is meant the additional force which is exerted by this mass when in momentum.

What I claim as my invention is:

1. A spring suspension for railway cars, comprising a nest of freely movable or live springs and one or more frictional resistance springs acting in unison.

2. A spring suspension for railway cars, comprising top and bottom follower plates, a plurality of freely movable helical springs interposed between said plates and distributed about the area thereof and one or more frictional resistance springs, all of said springs acting in unison.

3. A spring suspension for railway cars, comprising a freely movable helical spring and a shock absorbing spring having frictionally interengaging helices acting in unison with said freely movable spring.

4. A spring suspension for railway cars, comprising top and bottom follower plates, a plurality of freely movable helical springs between said plates at opposite ends and sides thereof and a centrally arranged shock absorbing spring having frictionally interengaging helices, all of said springs acting in unison.

5. A spring suspension for railway cars having a predetermined maximum static load comprising a freely movable spring capable of sustaining said static load and a frictional resistance spring for absorbing inertial loads, the said springs acting in unison.

6. A spring suspension for railway cars having a predetermined maximum static load comprising a freely movable spring and a frictional resistance spring acting in unison, said springs being in proportion to each other to freely sustain said static load and to absorb a portion of the energy of inertial loads.

7. A spring suspension for railway cars having a predetermined maximum static load comprising a freely movable spring and a frictional resistance spring acting in unison, said springs being proportioned to sustain said static load and freely return the same to normal position and to absorb the greater portion of the energy of inertial loads.

In testimony whereof I affix my signature.

HARRY W. FROST.

DISCLAIMER 1,633,011.—*Harry W. Frost*, Detroit, Mich. SPRING SUSPENSION FOR RAILWAY CARS. Patent dated June 21, 1927. Disclaimer filed October 6, 1937, by the assignee, *The Frost Railway Supply Co.*

Hereby enters this disclaimer to claims 1, 2, and 5 of said patent.
[*Official Gazette November 2, 1937.*]

DISCLAIMER 1,633,011.—*Harry W. Frost*, Detroit, Mich. SPRING SUSPENSION FOR RAILWAY CARS. Patent dated June 21, 1927. Disclaimer filed October 6, 1937, by the assignee, *The Frost Railway Supply Co.*

Hereby enters this disclaimer to claims 1, 2, and 5 of said patent.

[*Official Gazette November 2, 1937.*]